Patented July 17, 1951

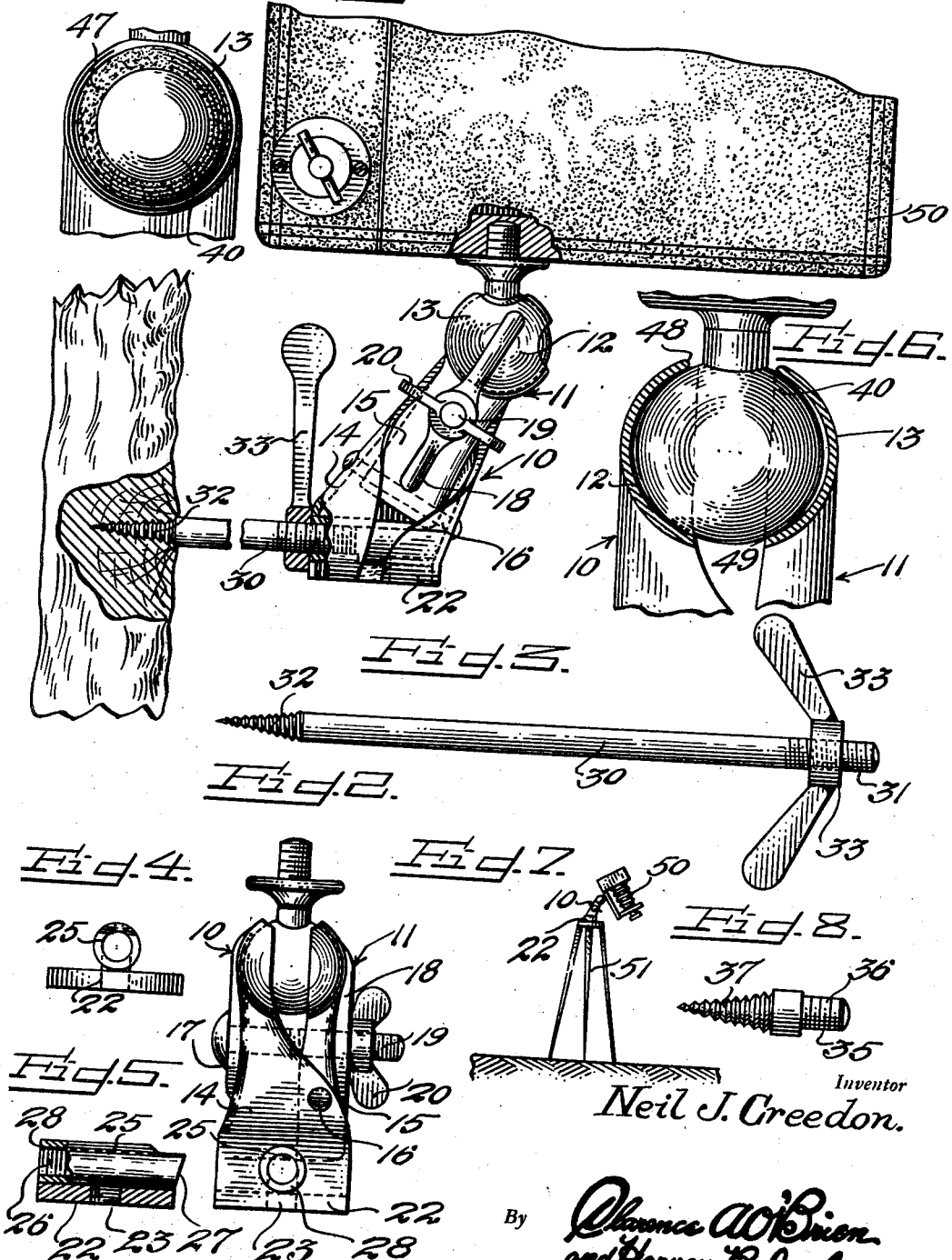

2,560,556

UNITED STATES PATENT OFFICE 2,560,556

MULTIPURPOSE CAMERA SUPPORT

Neil J. Creedon, Glens Falls, N. Y.

Application September 6, 1946, Serial No. 695,265

3 Claims. (Cl. 248—216)

This invention relates to improvements in supporting devices for cameras as described in my Patent No. 2,375,214 dated May 8, 1945. In this earlier patent I described a supporting device comprising a ball joint with a ball joint holder, integral with a bracket which is provided with carrying means, such as a shank with a tapered screw or the like, for attaching it to a fence or tree, and with further means, such as a flattened portion or disk, for attaching it to the head or table of a tripod.

It is the general object of the present invention to simplify the above described device and to render it more universally adaptable for use in various circumstances.

A more specific object of my invention consists in improving the construction described in my aforesaid earlier patent, by replacing the rigid single member forming the camera support which acts as an anchorage member for trees, as a tripod support and as a resilient ball joint socket holder, by separable members provided with means for joining them firmly so that they are capable of forming a unit, the operative parts of said unit being arranged in the general relationship which is described in my earlier patent.

It is a further more specific object of my invention to provide one of the ball socket carrier members with a disk-like base welded or otherwise permanently fixed to it which is capable of being fixed to a tripod and to provide said disk with means for fixedly holding a stem or shank, provided with a tapering screw which serves as an anchorage in a tree, fence, post or the like.

It is a further object of my invention to improve the ball socket carrier by providing approximately semi-spherical resilient ball sockets of a diameter smaller than the diameter of the ball to be gripped so that the gripping action, carried out, as a rule, by means of a screw will produce an annular spherical gripping zone with a pressure tapering off from the center or apex of each socket towards its circular edge.

Further objects will be apparent from the following specification describing one embodiment of the invention. It is however, to be understood that this invention is not to be regarded as consisting merely of the embodiment described. The camera support as described and illustrated is an example serving as a base for explaining the principles I intend to preferably apply in order to carry my invention into effect. However, I shall describe my invention in such terms and shall illustrate it in such a way that other embodiments may be constructed by experts skilled in this art by using the principles set forth in the specification. Such further modifications which are foreshadowed in the specification are therefore not departures from my invention.

In the accompanying drawings,

Figure 1 is an elevational side view of the camera support, showing said support when in use with a camera supported by a tree or fence.

Figure 2 is an elevational front view of the camera support.

Figure 3 is a view of the stem with tapered screw adapted to be fixed in the ball joint holder.

Figure 4 is a side view of a disk and screw threaded thereto adapted to be fixed to the base of the ball joint holder.

Figure 5 is a partly sectional view of the parts shown in Figure 4.

Figure 6 is a partly sectional view of the ball joint.

Figure 7 is a diagrammatic view of a camera when supported on a tripod.

Figure 8 is a view of a short stud to be used for special purposes, and

Figure 9 is a diagrammatic view of the ball when gripped within the socket members in which the zone of pressure contact has been stippled.

The improved camera support for multiple use consists of the two ball socket carriers 10, 11 each of which is provided with an approximately semi-spherical socket member 12, 13 respectively, carried by a base member 14, 15 respectively having the shape of a cylinder. The base member 14 of the outer carrier member 10 may be open or closed. The cylindrical base members 14, 15 are arranged one within the other and are joined by a bolt or rivet 16. Portions of the cylindrical base members are cut and these cut portions widen toward the ball socket carrying top so as to embrace less than a half cylinder, thus permitting relative movement of the members. To reinforce the cut portions, webs 17, 18 respectively, may be provided and the screw bolt 19, carrying winged nut 20, provided in order to draw the sockets towards each other, may pass through a suitable hole made through this reinforced portion of the socket carriers.

The base portion 14 of the outer member 10 is almost closed to form a cylindrical base which is however, inclined with respect to the general axis of the socket carrier so that when the base is, for instance, in a horizontal position, the ball socket carrier will be leaning over said base at a properly selected angle.

This foot or base portion of the carrier is closed by a disk 22 (Figs. 4 and 5) which is preferably welded to the same at its periphery and which is provided with a screw threaded hole 23 and carries a tube 25, the interior of which is also screw threaded at 26. The tube 25 is preferably welded to the disk and the hole 23 in the disk 22 finds a continuation in the tube 25. The end 27 of the tube may be beveled to fit the inclination of the foot 14 of the ball socket carrier 10 towards the disk and it may be welded to said foot.

The open end 28 of the tube passes through the wall of the foot 14 and is cut flush with this wall so that its screw threaded interior 26 is accessible from without and a flat outer surface surrounding said bore 26 results, for a purpose to be described. Into this hole the stem or shank 30 is inserted which is provided with a screw threaded end portion 31 fitting into the interior screw threads 26 of the tube 25 and with a second end portion 32 carrying a tapered screw which serves as a means for fixing the shank or stem on a tree, fence, post, stick or the like.

The screw threaded portion 31 carries moreover, a winged nut 33, provided either with one wing, to be operated by the thumb, as shown in Figure 1, or with two wings, as shown in Figure 3 and which serves as a counter or lock nut to fix the stem or shank 30 in the tube 25. The nut is firmly pressed against the aforesaid flat surface of the foot 14 for this purpose.

The disk 22 and its hole 23 serve as a means for fixing the ball socket carrier on the head or table of a tripod 51, as for instance, shown in Figure 7, which indicates diagrammatically how the tripod in this case may even be used for exposures in which the camera 50 is pointing downwardly towards the ground. The conventional stud with winged nut provided on the tripod (not shown) is used for fixing the ball socket carrier in its position on the table or head of the tripod by using the screw threaded hole 23 of the disk 22 in the well-known manner.

As shown in Figure 8, a short stud 35 provided with a screw threaded end 36 and with a tapering screw 37 may be threaded with its end 36 into the hole 23 of disk 22. When fixed in this position, the stud may serve to fix the camera directly upon the surface of a board, on which either the object to be positioned is placed, or which is used when the camera is to be used for enlargement or reproduction purposes. Then the frame holding the sensitive copying paper or the picture to be reproduced is placed on the board so as to be at right angle thereto at a suitable distance from the camera which is held upon the board by means of the said stud forming the anchorage for the base of the ball socket carrier which rests directly on the board.

It goes without saying that said stud may also be used in connection with the tube 25 if the occasion arises.

The camera 50 is held by the ball socket carrier by means of the conventional ball 40 carrying a stud 41 projecting from a disk 42 carried by said stud. While this construction is conventional, an improved way of holding the ball 40 within the two semi-spherical socket members is shown in Figures 6 and 9. As will be seen from Figure 6, the two semi-spherical ball socket members 12 and 13 are made of resilient material and are of a diameter which is smaller than the diameter of the ball 40. Therefore, the edges of the socket members 12 and 13 are closest to the ball when the latter is not gripped. When the two members are drawn towards each other by means of the nut 20, the circular edges 48, 49 of the semi-spherical socket members 12 and 13 come first into contact with the ball and as the force is mainly applied near the center or apex of the socket members, these members on account of their resiliency are gradually "flattened" out on the ball and a pressure zone 47 is formed which extends inwardly from the edges 48 or 49, as shown in the shaded area of Figure 9. Pressure is thus better distributed and covers a large annular spherical zone, tapering off towards the center or apex of the socket member. This method of gripping the ball joint is preferable to the conventional method according to which the pressure is mostly applied along a small zone on both sides of a meridian of the ball. This is a special advantage where heavy cameras or cameras with long focal distances are used.

The way in which the improved equipment is used will be obvious to anyone skilled in the art.

Preferably the stem or shank is screwed into a tree, fence or building or into a post driven into the ground while the ball socket carrier 10, 11 is screwed to the other end and is fastened there by means of the winged nut 33. The ball socket carrier is used as a handle to drive the tapered screw into the tree or fence. When the desired depth or the maximum depth has been reached the position of the ball socket carrier on the stem may be readjusted by lifting the winged nut 33. This is an important improvement as frequently the tapered screw cannot be driven further leaving the ball socket joint in an inconvenient position, and cannot be adjusted by turning the screw back as the grip of the screw is thereby loosened.

Another advantage consists in the fact that the camera and the ball socket carrier may be taken off for further use on a tripod or the like without having to remove the stem.

The stem may be removed in the same way in which it was mounted, turning merely in the opposite direction but holding the winged nut with one finger during the use of the ball socket carrier as a handle. This will prevent unscrewing on the winged nut so that the entire device may act as a unit.

The use of the short stud 35 has already been described.

The device may undergo many changes which will not affect its utility or usefulness.

I claim:

1. A multi-purpose support for cameras, provided with a camera carrying swivel ball and a socket, consisting of two pivotally connected, ball clamping members with foot portions encircling each other comprising a disk provided with a screw threaded bore adapted to cooperate with a tripod, fixed to the foot portion of one of said members at an angle with respect to the longitudinal axis of the ball socket carrier, a tube fixed on said disk within the foot portion of one ball socket camera member, reaching the outside through a hole in the wall of the same, said tube being provided with a screw threaded interior, a stem provided with a tapering screw at one end and with a screw threaded portion at the other end adapted to be screwed into the tube and a winged lock nut separately movable on said screw threaded end engaging the tube for fixing said stem in said ball socket carrier.

2. A multi-purpose support for cameras provided with a camera carrying swivel ball and a socket consisting of two pivotally connected ball clamping members with foot portions encircling each other and carrying approximately semi-spherical resilient ball sockets of a diameter smaller than the diameter of the camera carrying ball, means for pressing the ball sockets against the ball, said pressure producing elastic deformation of the ball gripping surfaces of the ball sockets and an improved gripping contact with the ball, a flat disk provided with a bore fixed to one of said members in a position inclined with respect to the longitudinal axis of the ball clamping members and further provided with a threaded bore for cooperation with a tripod, a tube with a screw threaded interior fixed on said disk, a stem provided with a tapering screw and with a screw threaded end adapted to be screwed into said tube.

3. A multi-purpose support for cameras with a camera carrying swivel ball and a socket for holding the same, consisting of two pivotally joined ball clamping members, comprising a disk provided with a threaded bore for cooperation with a tripod fixed to one of said members at an angle to the longitudinal axis of the ball socket carrier, a tube with a screw threaded interior fixed on said disk, a supporting element adapted to engage wooden objects provided with a tapering screw at one of its ends and with screw threads adapted to engage the threaded interior of the tube at its other end.

NEIL J. CREEDON.

REFERENCES CITED

The following references are of record in the file of this patent:

UNITED STATES PATENTS

| Number | Name | Date |
|---|---|---|
| 1,280,013 | Goddard | Sept. 24, 1918 |
| 2,012,941 | Corron et al. | Sept. 3, 1935 |
| 2,128,046 | Heil | Aug. 23, 1938 |